United States Patent

Patterson

[11] Patent Number: 6,142,292
[45] Date of Patent: Nov. 7, 2000

[54] METHOD AND APPARATUS TO PREVENT A BEARING FROM ROTATING IN A BEARING HOUSING

[75] Inventor: Harold E. Patterson, Indiana, Pa.

[73] Assignee: FMC Corporation, Chicago, Ill.

[21] Appl. No.: 09/274,178

[22] Filed: Mar. 23, 1999

[51] Int. Cl.$^7$ .......................... B65B 27/20; F16C 33/04
[52] U.S. Cl. .......................... 198/770; 384/295; 384/428
[58] Field of Search .......................... 198/770; 384/295, 384/296, 428, 438

[56] References Cited

U.S. PATENT DOCUMENTS

| | | | |
|---|---|---|---|
| 4,313,535 | 2/1982 | Carmichael | 198/766 |
| 5,129,737 | 7/1992 | Stenner | 384/428 |
| 5,131,525 | 7/1992 | Musschoot | 198/770 |
| 5,489,156 | 2/1996 | Martinie | 384/538 |
| 5,584,375 | 12/1996 | Burgess, Jr. et al. | 198/770 |
| 5,615,763 | 4/1997 | Schieber | 198/770 |
| 5,762,176 | 6/1998 | Patterson et al. | 198/770 |
| 5,820,270 | 10/1998 | Richardson | 384/275 |
| 5,906,523 | 5/1999 | Thomson | 384/428 |

FOREIGN PATENT DOCUMENTS

| | | | |
|---|---|---|---|
| 0153012 | 7/1986 | Japan | 384/295 |
| 404019420 | 1/1992 | Japan | 384/428 |

OTHER PUBLICATIONS

Bauer Spring Inc., "Disc Springs For Ball Bearings," 4 pages.
Schnorr–Neise Corp., "K Springs," 4 pages.

Primary Examiner—Robert P. Olszewski
Assistant Examiner—Paul T. Chin
Attorney, Agent, or Firm—Rockey, Milnamow & Katz, Ltd.

[57] ABSTRACT

The bearing includes a cylindrical bearing, such as a sleeve bearing or a ball bearing, having a central opening for receiving a shaft and having a first radial surface. The assembly includes a bearing housing having a surrounding wall which defines an open distal end and an open base end. The housing has a second radial surface extending inwardly from the surrounding wall. The assembly includes a support wall arranged adjacent to the open base end of the housing. The assembly includes a plurality of threaded fasteners which are inserted through holes provided on the bearing housing and are threaded onto threaded apertures provided in or behind the support wall. Tightening of the fasteners draws the bearing housing to the support wall. A spring, such as a Belleville washer, is placed between the support wall and the bearing to resiliently press the first radial surface against the second radial surface. When the housing and support wall are drawn tight the spring is compressed under great force. This presses the first and second radial surfaces together under great force. Thus, there is an axially force between the first and second radial surface and the washer and the trailing end of the bearing and the support plate which fixes the bearing against any relative rotary movement between the bearing and the housing.

24 Claims, 3 Drawing Sheets

METHOD AND APPARATUS TO PREVENT A BEARING FROM ROTATING IN A BEARING HOUSING

TECHNICAL FIELD OF THE INVENTION

The invention relates to a bearing held within a bearing housing, wherein the bearing supports a moving shaft. Particularly, the invention relates to a mechanism for preventing a bearing insert from moving within a surrounding bearing housing.

BACKGROUND OF THE INVENTION

Vibratory conveyors are widely used for material handling, and typically include a generally elongated conveyor bed, and an associated vibratory drive. Operation of the vibratory drive induces vibratory motion in the conveyor bed, which motion in turn induces movement of articles along the bed. Vibratory drives for such devices typically include one or more pairs of counter-rotating shafts having eccentrically-mounted weights thereon for inducing the desired vibration of the conveyor bed.

In the design of machinery involving the use of rotating shafts, bearings are employed to support the shafts, and to allow them to rotate freely with a minimum energy loss from friction. For cost effective design, it is desirous to minimize the weight of such machinery as much as possible. This is particularly true in the design of vibratory conveying and feeding equipment where unnecessary weight is detrimental in terms of increased power requirement, size, isolation system, and cost.

One approach to weight reduction involves the use of readily available standard bearing housings into which the bearings are press fitted. This approach is advantageous compared to press fitting the bearings directly into the wall of the support structure which would require the wall to be of substantial thickness thereby adding considerable weight and cost to the structure. The bearing housing generally consists of a cast iron ring with a mounting flange that may be an integral part of the housing, or may be a separate formed sheet steel component keyed to hold the cast iron ring in place. A hole is bored into the center of the cast ring, sized to the proper diameter for a press fit of the bearing insert into the hole.

The bearing and bearing housing together are fitted to an end of the shaft, which then can be bolted to the periphery of a hole cut in the wall of the support structure used to mount the shaft as applicable to the particular machine design. A further bearing housing and bearing can be fitted to the opposite end of the shaft, and the further bearing housing can also be bolted to the support structure as applicable to the particular machine design.

SUMMARY OF THE INVENTION

The present invention provides a low cost apparatus and method for preventing a bearing, fit in a bearing housing, from rotating within the housing when subjected to loads, such as eccentric loads that would be encountered in vibratory feeder and conveyor applications. The bearings can be, for example, a press fit or slide fit bearing fit into a standard light weight bearing housing.

In applications where the rotating shaft imposes an eccentric load on the bearing, as would be the case for vibratory conveying and feeding equipment, the present inventor has recognized a potential problem whereby the orbiting peak force may be large enough to overcome the press fit hoop forces holding the bearing in place, causing the bearing to rotate in the bearing housing and resulting in premature failure of the bearing.

The recognition of this failure mechanism involved FEM analysis and testing. The source of the problem was elusive heretofore because of the apparent substantiality of the cast iron ring of the bearing housing and the randomness of the failures encountered, in that some bearings failed quickly, others failed at various longer time intervals, and some did not fail at all during the period in which the problem existed. As it turns out, the bearing housing can only exert as much holding force as that limited by the insertion of the bearing to cause the housing ring to stretch elastically, analogous to placing an elastic band around some objects to keep them together. In applications involving 1 7/16" bearings and 1 15/16" bearings for example, the measured forces holding the bearings amounted to forces only in the range of 250 to 450 lbs., far below the peak rotational forces generated by the eccentric shaft loading. The randomness of the failures is in part attributed to manufacturing tolerances in the machining of the press fit hole in the housing ring, and to differences in application due to the actual load seen by the bearing.

The bearing assembly of the invention includes a bearing, such as a sleeve bearing or a ball bearing, having a central opening for receiving a shaft and having a first radial surface. The assembly includes a bearing housing having a surrounding wall which defines an open distal end and an open base end. The housing has a second radial surface extending radially inwardly from the surrounding wall. The assembly includes a support wall or support plate arranged adjacent to the open base end of the housing. The assembly includes at least one male thread formation and at least one coacting female thread formation associated with the bearing housing and the support wall. Relative rotation between the male thread formation and the female thread formation draws the bearing housing to the support wall. A spring, such as a Belleville washer or frustoconically-shaped washer, is placed between the support wall and the bearing such that when compressed, the washer resiliently presses the first radial surface against the second radial surface.

Advantageously, the male thread formation and the female thread formation are provided by a plurality of threaded fasteners which are inserted through holes provided on the bearing housing and are threaded into threaded apertures provided by the support wall, or by nuts located behind, or associated with the support wall.

When the housing and support wall are drawn toward each other, the spring is compressed under great force. This presses the first and second radial surfaces together under great force. Thus, there is an axial force between the first and second radial surface and the washer and the trailing end of the bearing and the support plate which frictionally fixes the bearing against any relative rotary movement between the bearing and the housing.

The invention provides a novel method and assembly to hold the bearing in the bearing housing with sufficient force to prevent the bearing from rotating under the applied loads previously discussed. The invention is advantageously applied to vibratory feeders and conveyors. The invention is also useful in a variety of applications that utilize a standard or press fit between the bearing and bearing housing that may have similar applied loads or that may otherwise require additional holding force to prevent the bearing from rotating in the housing.

Figure 1:
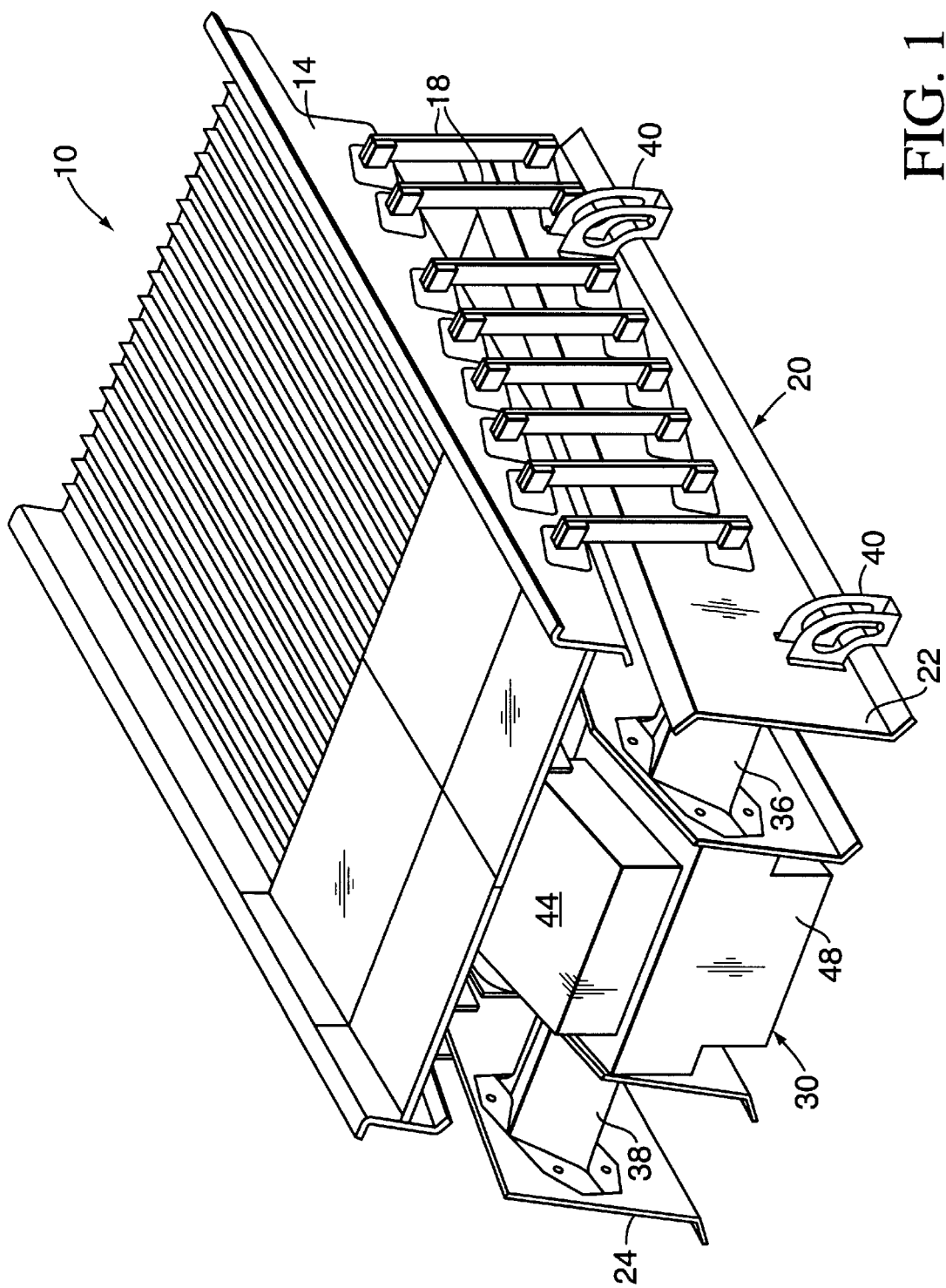
FIG. 1 is a perspective view of a vibratory conveyor which incorporates bearing assemblies of the present invention.

Other features and advantages of the present invention will become readily apparent from the following detailed description, the accompanying drawings, and the appended claims.

DETAILED DESCRIPTION OF THE PREFERRED EMBODIMENTS

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment.

FIG. 1 illustrates a vibratory conveying apparatus 10 which incorporates the present invention. The apparatus can be, for example a conveyor or a feeder. The apparatus 10 includes a trough 14 mounted via a plurality of leaf springs 18 to a base frame 20. The base frame 20 includes longitudinal side walls 22, 24 and intermediate connecting members (not shown) which connect the two side walls to form a rectangular space frame. At one end of the conveyor 10, beneath the trough 14 is a vibratory drive 30. The drive 30 is supported from the walls 22, 24 by struts 36, 38. The side walls 22, 24 are supported from lugs 40 which can be arranged at or near to four corners of the frame 20. The base frame can either be supported from above or below on the lugs 40.

The drive 30 excites the base 20 into reciprocal vibration which in turn causes the spring supported trough to vibrate. Alternatively the drive can be directly connected to the trough.

The drive 30 includes an upper housing cover 44 which encloses timing pulleys of the drive as described below. A lower housing 48 encloses rotating eccentrically mounted weights and motor drive apparatus as described below.

Figure 2:
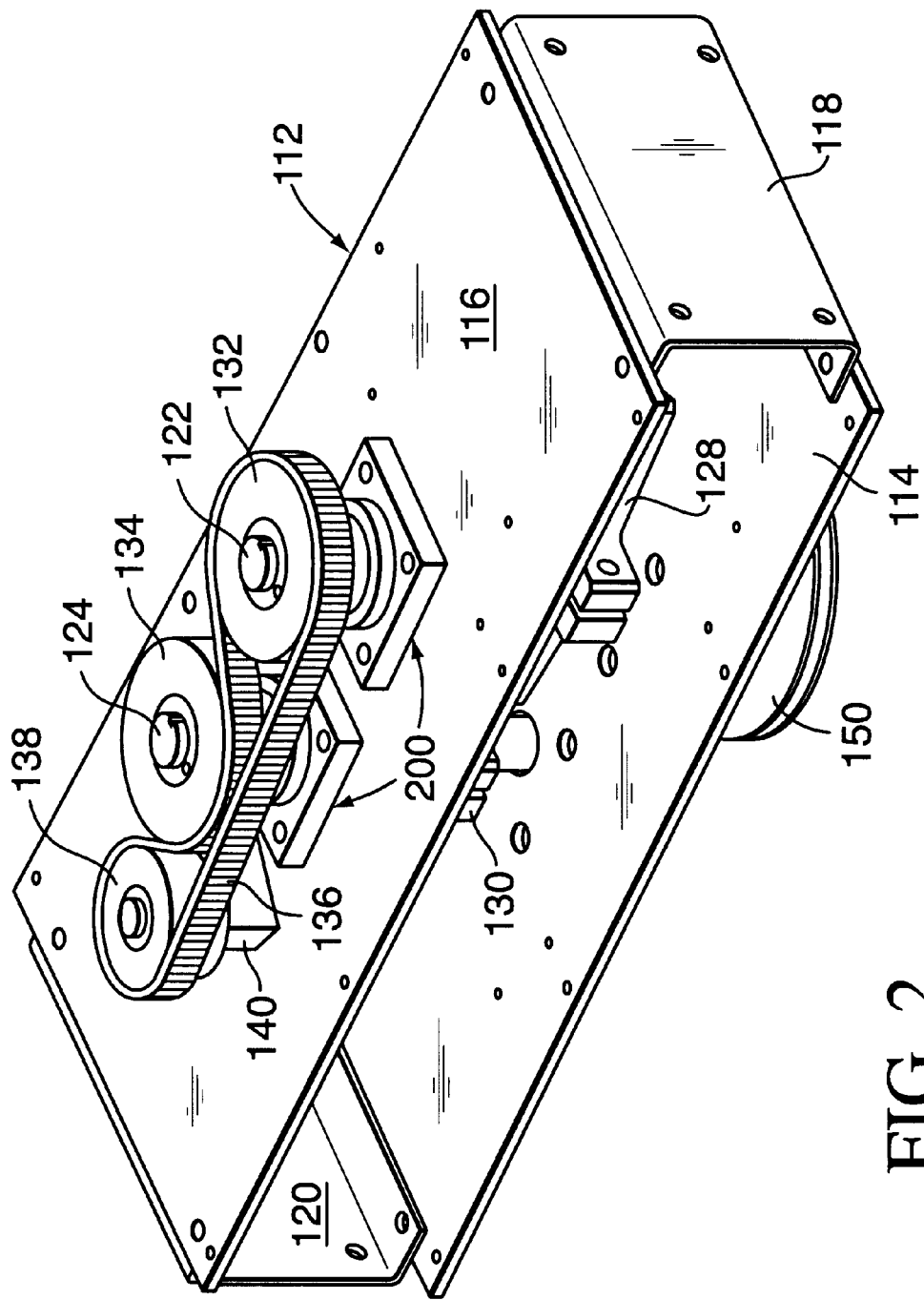
FIG. 2 is a perspective view of a vibratory drive taken from the apparatus of FIG. 1, with portions removed for ease of description, which shows bearing assemblies of the present invention.

FIG. 2 illustrates a vibratory drive 30 such as described in U.S. Pat. No. 5,762,176, herein incorporated by reference. In FIG. 2, the cover 44 and portions of the housing 48 are removed for ease of description.

The drive 30 includes a housing 112 comprising generally parallel, spaced apart machine walls 114, 116, with a pair of end plates 118, 120. Extending between respective opposite ends of the machine walls 114, 116.

Vibratory drive 30 is configured to create the desired vibratory forces for product conveyance by counter-rotation of eccentrically mounted weights. To this end, the apparatus includes first and second drive shafts 122, 124 respectively rotatably mounted on the machine walls 114, 116 of housing 112 in parallel relationship to each other.

First and second bearing assemblies 200 as described below, are provided for respectively mounting the first and second drive shafts on the housing 112. Vibratory weights 128, 130 are respectively mounted on the drive shafts so that counter rotation of the drive shafts causes the weights to create vibratory forces through the housing perpendicular to the axis of the drive shafts.

Counter-rotation of the drive shafts is effected via respective toothed drive pulleys 132, 134 mounted on the drive shafts. A double sided toothed drive belt 136 is trained about the drive pulleys 132, 134 with one side of the drive belt 136 meshing with one of the drive pulleys and the other side of the drive belt meshing with the other of the drive pulleys. The toothed drive belt 136 is also trained about an adjustable idler 140.

A motor (not shown) drives a driven pulley 150 mounted to the drive shaft 122 to effect rotation of the drive shafts and vibratory weights.

Figure 3:
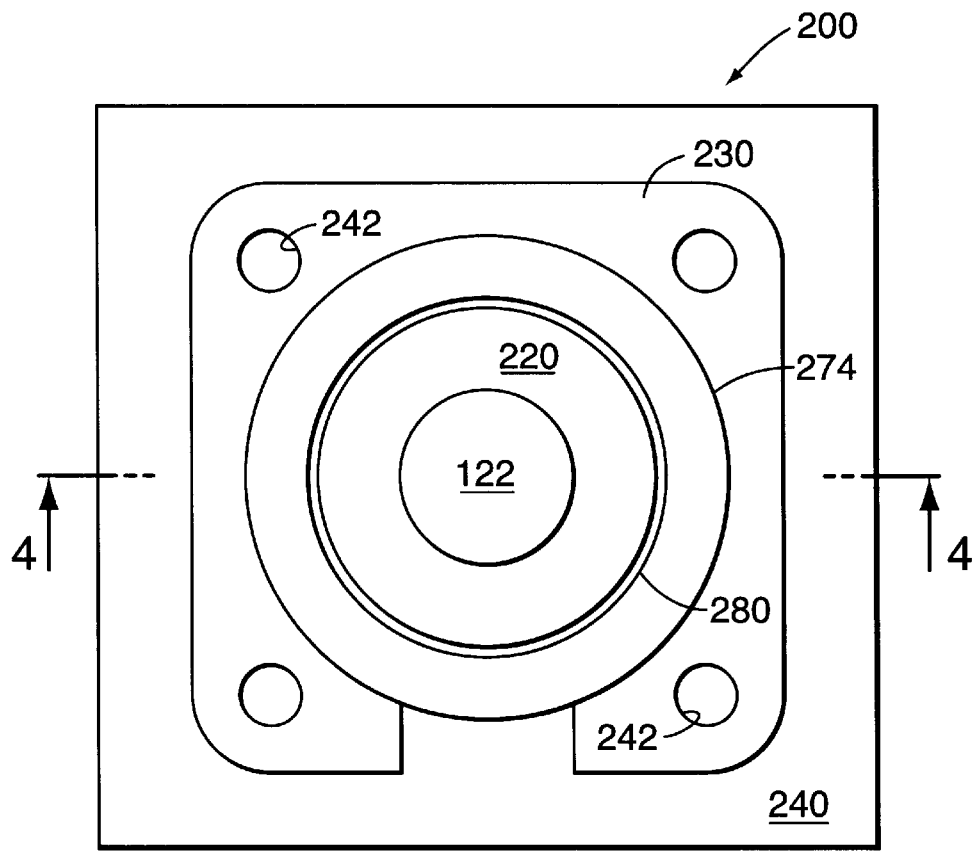
FIG. 3 is a schematic elevational view of a bearing assembly of the present invention.
Figure 4:
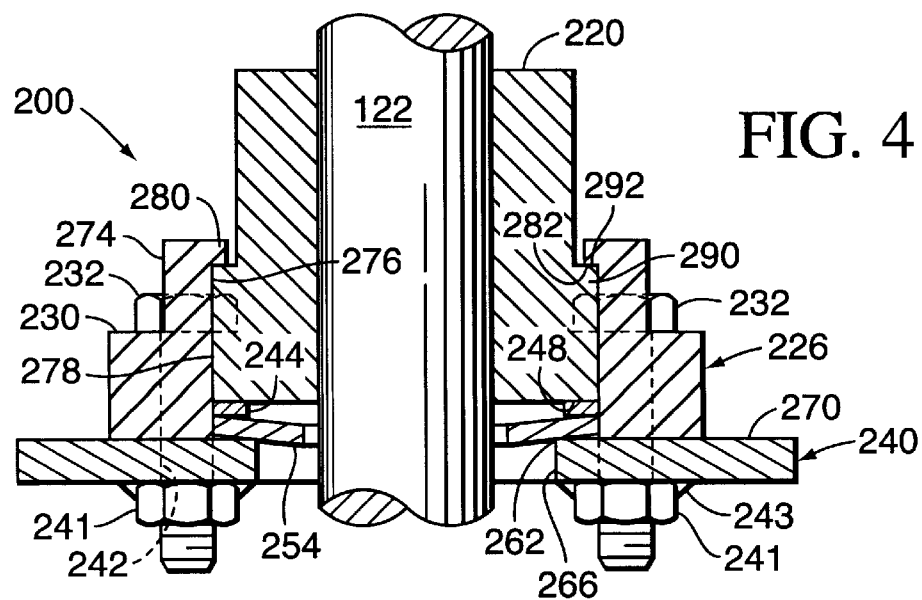
FIG. 4 is a schematic sectional view taken generally along line 4—4 of FIG. 3.

FIGS. 3 and 4, are drawings of the present inventive bearing assembly 200 which incorporates a typical bearing 220, for example a Dodge Imperial spherical roller bearing part #F4B-IP-115 that is $1^{15}/_{16}$" diameter, or their part #F4B-IP-107 that is $1^{7}/_{16}$" diameter. The bearing is shown schematically, without bearing detail. Alternatively the bearing could be configured as disclosed in U.S. Pat. No. 5,489,156, herein incorporated by reference. The bearing 220 surrounds the shaft 122, for example. The bearing 220 is pressed into a bearing housing 226. The bearing housing includes a flange 230 with four mounting holes 242 for four fasteners 232 used to tighten the bearing housing 226 to a support wall such as a structural mounting plate 240. The structural mounting plate 240 can be welded or otherwise attached to the machine wall (machine wall 116 for example as shown in FIG. 2). The fasteners 232 are shown in FIG. 4 but omitted in FIG. 3.

The support wall can be a plate such as the rectangular plate 240, or can be an integral portion of the machine wall. The fasteners can engage nuts 241 arranged behind the plate 240, or can engage threads provided by the plate. Threads provided by the plate can be formed by tapping holes 242 in the plate or by welding nuts 241 to the plate, as shown at 243. Other types of threaded engagement between the housing and the wall are encompassed by the invention, including the use of circumferential threads on the housing and cooperating threads on the wall such that relative turning between the housing and wall causes them to be drawn together.

A steel spacer ring 244, for example, a ring laser-cut from 7 Ga. steel for use with the bearing part #F4B-IP-115, or a ring laser cut from 10 Ga. steel for use with the bearing part #F4B-IP-107, is placed next to the side of the spherical roller bearing 220 such that it makes contact with the peripheral edge surface 248 of the side of the spherical roller bearing 220 the surface 248 typically being on the outer race of the bearing. A Belleville spring washer or frustoconically-shaped washer 254, for example Key Bellevilles Inc. part #80-41-4 or part #90-46-5 is placed next to the steel spacer ring 244 such that it's outer peripheral edge contacts the steel spacer ring 244, and the surface of the Belleville spring washer 254 makes contact with the edge 262 of a shaft opening 266 in the structural mounting plate 240.

The housing 226 includes a ring portion 274 extending from the flange 230. The ring portion is sized to have an inner surface 276 to fit closely against an outside surface 278 of the bearing 220. The fit can be a press fit or a slide fit. Extending radially inwardly from an end of the ring portion is a lip 280 having a radial surface 282. The bearing 220 includes a ledge 290 having a radial surface 292 which confronts the radial surface 282 of the lip 280.

The solution to the problem of the bearing 220 rotating in the bearing housing 226 is to apply an axial force to the peripheral edge surface 248 of the end of the bearing 220 and to apply an axial force to the ledge 290 of the bearing 220 such that it's resultant holding force, by friction, in the rotational direction is greater than the applied forces from the loads that cause it to rotate. When the bearing housing 226 is tightened to the structural mounting plate 240, a "crown" (difference between the uncompressed thickness and the totally compressed thickness) of the Belleville spring washer 254 which protrudes above the mounting surface 270 of the support wall 240 by a known amount, is compressed, a force is applied to the side of the bearing 220 through the spacer ring 244 and a reaction force is applied to the ledge 290 by the lip 280 of the housing 226.

The thickness of the steel spacer ring 244 determines the amount of compression of the Belleville spring washer 254, and assures that the force from the compressed Belleville spring washer 254 is evenly distributed around the peripheral side surface of the outer race of the bearing 220. The width of the steel spacer ring 244 is set so that there is no interference with the rotation of the bearing 220 inner race and shaft 122. For example, the 10 Ga. thick spacer ring 244 used with the bearing 220 part #F4B-IP-107 and Belleville spring washer 254 part #80-41-4 sized to allow 100% deflection of the washer would produce a force of 6617 lbs., while the 7 Ga. thick spacer ring 244 used with the bearing 220 part #F4B-IP-107 and Belleville spring washer 254 part #90-46-5 sized to allow 100% deflection of the washer would produce a force of 9292 lbs.

Thus, a set axial preload on the end surface of the outer ring of a bearing is used to prevent the bearing from rotating within the cavity of the bearing housing.

Although the bearings are illustrated with respect to a particular vibratory conveyor illustrated in FIGS. 1 and 2, other types of machines which utilize bearings and bearing housings can incorporate the bearing assembly of the present invention.

The invention provides a method of fixing a bearing within a bearing housing to prevent rotation thereof, which comprises the steps of:

providing a bearing housing 226 having a radial surface 292 and a base end;

providing a bearing 220 having a radial surface 282 and a trailing end surface 248;

inserting the bearing 220 into the housing 226 with the radial surface 282 facing the radial surface 292;

placing a spring element such as a spring washer 254 into the housing facing toward the trailing end surface;

providing a support wall 240 adjacent to the bearing housing base end capturing said bearing 220 and said spring element 254 between the radial surface 292 and the support wall 240; and forcibly drawing the housing to the support wall to resiliently press the radial surfaces together under force from the spring element.

The method can also comprise the further step of, before placing the spring element into the housing, placing a spacer ring 244 against the trailing end surface 248 of the bearing 220, the spacer ring having an inside diameter greater than an inside diameter of the washer.

The method step of placing the spring element can be further defined in that the spring element comprises a compressible washer.

The method step of forcibly drawing the housing to said support wall can be further defined in that at least one first portion mechanically associated with the housing and at least one second portion mechanically associated with the support wall have a male-female interengaged threaded relationship, and by relatively turning the first and second portions, the housing is drawn to the support wall.

The method can also include the further step of inserting a shaft into the bearing, through the washer and through an opening of the support wall. The method can include the further step of attaching the support wall to a structure, such as a machine wall, for supporting the shaft.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

The invention claimed is:

1. A vibratory conveying apparatus, comprising:
   a trough for conveying pieces;
   at least one shaft, rotation of said shaft transmitting vibratory forces to said trough;
   a structure for supporting said trough and said base;
   at least one bearing assembly, supporting said shaft and mounted to said structure, said bearing assembly including a bearing having a central opening for receiving said shaft and having at least one first radial surface, a bearing housing having a surrounding wall defining an open distal end and an open base end, and having at least one second radial surface connected to said surrounding wall, a support wall arranged adjacent said open base end of said housing, at least one male thread formation and at least one coacting female thread formation associated respectively with said bearing housing and said support wall, said housing drawn toward said support wall when said male thread formation is advanced along said female thread formation, and a spring element arranged between said support wall and said bearing to resiliently press said at least one first radial surface to said at least one second radial surface when said male thread formation is advanced on said female thread formation, the support wall being mounted to said structure.

2. The vibratory conveying apparatus according to claim 1, wherein said spring element comprises a frustoconically-shaped washer.

3. The vibratory conveying apparatus according to claim 1, wherein said spring element comprises a frustoconically-shaped washer having an outer edge and a central hole defining an inner edge, said washer oriented to extend in a radial direction from said outer edge toward said inner edge obliquely toward said support wall, and comprising a spacer ring arranged between facing surfaces of said bearing and said washer, said spacer ring sized to be pressed against an outer annular surface area of said washer which is adjacent to said outer edge of said washer.

4. The vibratory conveying apparatus according to claim 1, wherein said first radial surface comprises an annular ledge of said bearing which faces away from said support wall, and said second radial surface comprises an annular lip that extends inwardly from said surrounding wall of said housing.

5. The vibratory conveying apparatus according to claim 1, wherein said support wall comprises a plate having a rectangular perimeter.

6. The vibratory conveying apparatus according to claim 1, wherein said support wall is formed by a wall of a machine.

7. The vibratory conveying apparatus according to claim 1, wherein said at least one male thread formation and at least on female thread formation comprise a plurality of threaded fasteners and corresponding threaded apertures.

8. The vibratory conveying apparatus according to claim 3, wherein an inside diameter of said spacer ring is greater than an inside diameter of said washer.

9. The vibratory conveying apparatus according to claim 7, wherein said threaded apertures are formed into said support wall.

10. A bearing assembly, comprising:
 a bearing having a central opening for receiving a shaft and having a first radial surface;
 a bearing housing having a surrounding wall which defines an open distal end and an open base end, and having a second radial surface connected to said surrounding wall;
 a support wall arranged adjacent to said open base end of said housing;
 at least one male thread formation and at least one coacting female thread formation which are together associated with said bearing housing and said support wall to draw said bearing housing toward said support wall when said male thread formation is advanced along said female thread formation; and
 a spring element arranged between said support wall and said bearing to resiliently press said at least one first radial surface to said at least one second radial surface when said male thread formation is advanced on said female thread formation.

11. The assembly according to claim 10, wherein said spring element comprises a frustoconically-shaped washer.

12. The assembly according to claim 10, wherein said spring element comprises a frustoconically-shaped washer having an outer edge and a central hole defining an inner edge, said washer oriented to extend in a radial direction from said outer edge toward said inner edge obliquely toward said support wall, and comprising a spacer ring arranged between facing surfaces of said bearing and said washer, said spacer ring sized to be pressed against an outer annular surface area of said washer which is adjacent to said outer edge of said washer.

13. The assembly according to claim 10, wherein said first radial surface comprises an annular ledge of said bearing which faces away from said support wall, and said second radial surface comprises an annular lip that extends inwardly from said surrounding wall of said housing.

14. The assembly according to claim 10, wherein said support wall comprises a plate having a rectangular perimeter.

15. The assembly according to claim 10, wherein said support wall is formed by a wall of a machine.

16. The assembly according to claim 10, wherein said at least one male thread formation and at least on female thread formation comprise a plurality of threaded fasteners and corresponding threaded apertures.

17. The assembly according to claim 12, wherein an inside diameter of said spacer ring is greater than an inside diameter of said washer.

18. The assembly according to claim 8, wherein said threaded apertures are formed into said support wall.

19. A method of fixing a bearing within a bearing housing to prevent rotation thereof, comprising the steps of:
 providing a bearing housing having a first radial surface and a base end;
 providing a bearing having a second radial surface and a trailing end;
 inserting said bearing into said housing with said first radial surface facing said second radial surface;
 placing a spring element into said housing facing toward said trailing end;
 providing a support wall adjacent to said bearing housing base end capturing said bearing and said spring element between said first radial and said support wall; and
 forcibly drawing said housing to said support wall to resiliently press said first and second radial surfaces together under force from said spring element.

20. The method according to claim 19, comprising the further step of, before placing said spring element into said housing, placing a spacer ring against said trailing end of said bearing, and wherein said spring element comprises a frustoconically-shaped washer oriented to taper toward said support wall, and said spacer ring having an inside diameter greater than an inside diameter of said washer.

21. The method according to claim 19, wherein said step placing said spring element is further defined in that said spring element comprises a compressible washer.

22. The method according to claim 19, wherein said step of forcibly drawing said housing to said support wall is further defined in that at least one first portion associated with the housing and at least one second portion associated with said support wall have a male-female interengaged threaded relationship, and by relatively turning the first and second portions, the housing is drawn to the support wall.

23. The method according to claim 19, comprising the further step of inserting a shaft into the bearing through said washer and through an opening of said support wall.

24. The method according to claim 23, comprising the further step of attaching the support wall to a structure, for supporting the shaft.

\* \* \* \* \*